(12) United States Patent
Fisher

(10) Patent No.: US 11,900,337 B1
(45) Date of Patent: *Feb. 13, 2024

(54) DISTRIBUTED LEDGER RECEIPT WALLET SYSTEM AND METHOD

(71) Applicant: United Services Automobile Association (USAA), San Antonio, TX (US)

(72) Inventor: Jon Fisher, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 128 days.

This patent is subject to a terminal disclaimer.

(21) Appl. No.: 17/549,261

(22) Filed: Dec. 13, 2021

Related U.S. Application Data

(63) Continuation of application No. 16/569,212, filed on Sep. 12, 2019, now Pat. No. 11,200,546.

(60) Provisional application No. 62/811,357, filed on Feb. 27, 2019.

(51) Int. Cl.
*G06Q 20/16* (2012.01)
*G06Q 20/20* (2012.01)
*G06Q 20/04* (2012.01)
*G06Q 20/38* (2012.01)
*G06Q 20/36* (2012.01)

(52) U.S. Cl.
CPC ......... *G06Q 20/047* (2020.05); *G06Q 20/202* (2013.01); *G06Q 20/36* (2013.01); *G06Q 20/389* (2013.01)

(58) Field of Classification Search
CPC .... G06Q 20/047; G06Q 20/202; G06Q 20/16; G06Q 20/389
See application file for complete search history.

(56) References Cited

U.S. PATENT DOCUMENTS

| 11,200,546 | B1* | 12/2021 | Fisher | G06Q 20/047 |
| 2017/0352031 | A1* | 12/2017 | Collin | G06Q 20/38 |
| 2018/0091524 | A1* | 3/2018 | Setty | H04L 9/3247 |
| 2018/0096347 | A1* | 4/2018 | Goeringer | H04L 9/3247 |
| 2018/0300708 | A1* | 10/2018 | Dar | G06Q 20/36 |

OTHER PUBLICATIONS

NPL_Blockchain Data. Blockchain and Distributed Ledgers as Trusted Recordkeeping Systems: An Archival Theoretic Evaluation Framework, Published 2017, downloaded Sep. 16, 2021 from https://www.researchgate.net/publication/317433591, 11 pages (Year: 2017).

* cited by examiner

*Primary Examiner* — Paul Danneman
(74) *Attorney, Agent, or Firm* — Fletcher Yoder P.C.

(57) ABSTRACT

Techniques are described for creating and tracking receipts via a digital distributed ledger system. The techniques include receiving a purchase data, and transforming the purchase data into at least one receipt trail record. The techniques further include storing the receipt trail record in a least one block of digital distributed ledger system. The techniques additionally include distributing the at least one block among nodes of the digital distributed ledger system, wherein the digital distributed ledger system is configured to immutably store the data of the receipt trail record.

20 Claims, 4 Drawing Sheets

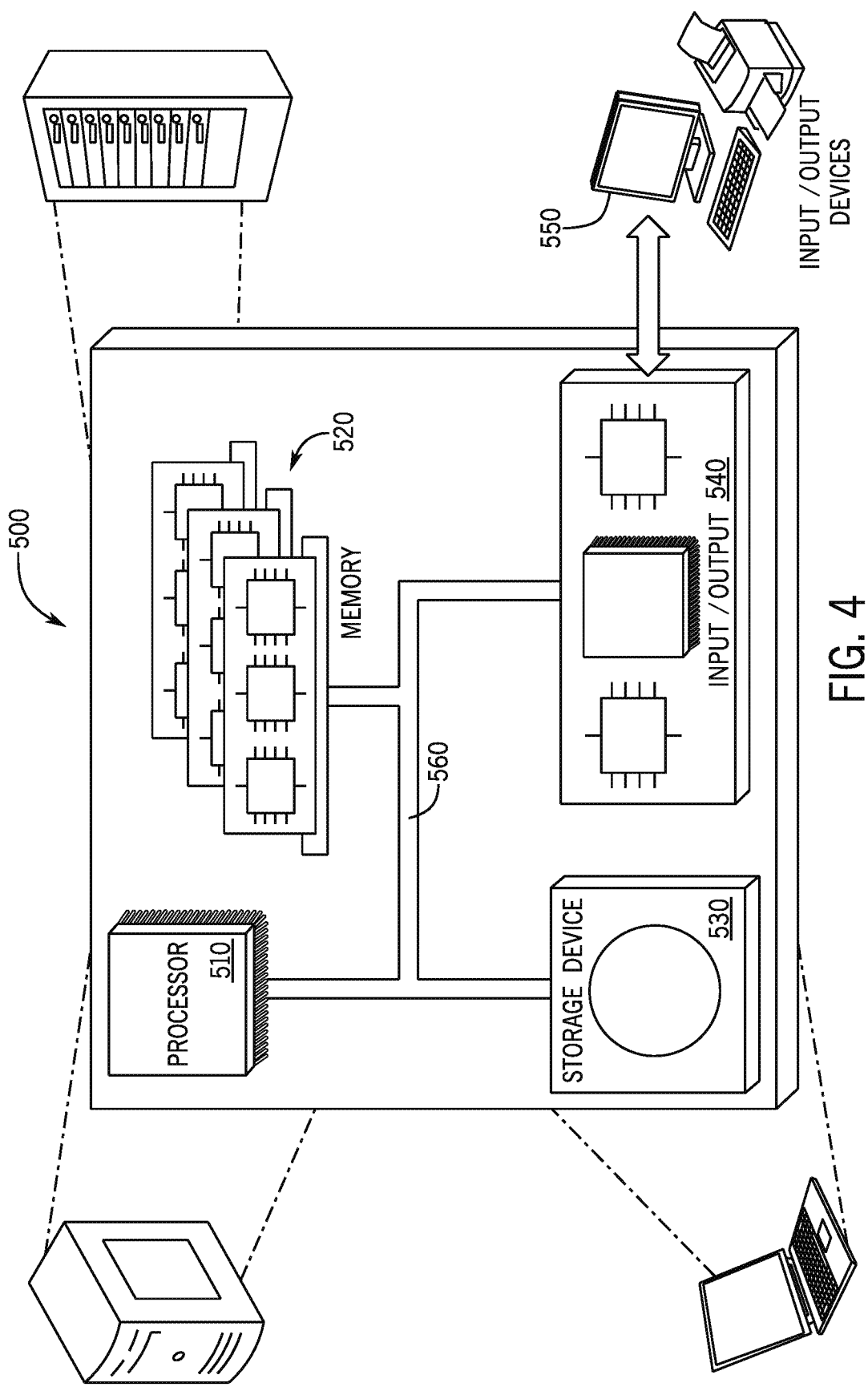

DISTRIBUTED LEDGER RECEIPT WALLET SYSTEM AND METHOD

CROSS-REFERENCES TO RELATED APPLICATIONS

This is a continuation of U.S. patent application Ser. No. 16/569,212, titled "DISTRIBUTED LEDGER RECEIPT WALLET SYSTEM AND METHOD," filed on Sep. 12, 2019, which is related to, and claims priority to, U.S. Provisional Patent Application Ser. No. 62/811,357, titled "DISTRIBUTED LEDGER RECEIPT WALLET SYSTEM AND METHOD," filed on Feb. 27, 2019, which are herein incorporated by reference in their entireties for all purposes.

BACKGROUND

The present disclosure relates generally to distributed ledgers, and more particularly to systems and methods for receipt wallets via a distributed ledger.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Various entities, including users of retail systems may engage in various retail transactions. For example, a person or entity (e.g. corporation) may use a retail system to purchase various items and services. Each purchase typically results in a receipt, acknowledging that the transaction took place, the date of the transaction, the monetary value involved, and so on. The receipt may then be kept, for example, for tax purposes, for warranty purposes, in case a return of merchandise has to occur, and the like. The techniques described herein may provide for improvement in systems and methods for receipt wallets (e.g., storage system for receipts) suitable for interfacing with various systems, including but not limited to banking and/or insurance systems.

BRIEF DESCRIPTION

The techniques described herein are generally directed at distributed ledger-based systems that create and manage immutable trails of documents and/or transactions that may more efficiently provide for receipt wallets. More particularly, embodiments of the present disclosure are directed to using a distributed ledger, such as a blockchain, to provide an immutable or otherwise unchangeable record of certain documents and transactions related to purchases from various retail and service systems, including virtual stores and brick-and-mortar stores, and services that may include banking and insurance services, among others. The distributed ledger may further provide for crypto security features and for records that may be verified to provide for enhanced security and trust. Additionally, certain transactions may be automatically stored, signed and updated through blockchain techniques, eliminating middlemen and providing for enhanced transactional efficiencies.

A receipt wallet may contain information related to an entity, including an individual, a corporation, a club, and so on. Entity information may include a purchase history. That is, when the entity purchases and item and/or a service, certain blockchain records may be prepared and processed to conform to receipt intake processes, as further described below. Once a "receipt" is created and entered into the receipt wallet, the wallet provides for a storage system that may be used to deliver the receipts for tax purposes, for audit purposes, for regulatory purposes, and so on. The techniques described herein may create immutable audit trail of documents, data, and/or transactional purchasing history. In certain embodiments, each trail may be stored in one or more distributed ledgers, such as blockchains and/or sidechains. The stored information may be provided via degrees of granularity and/or security to respective auditing entities. For example, rather than providing a file "dump" containing assorted documents, including documents that may not be relevant to a particular audit entity, each audit trail may instead provide relevant and verifiable documents geared towards enabling a more efficient and secure audit of receipt information. Indeed, as further described below, certain systems and methods may automatically create receipt trails which may then be securely provided to external entities. The external entities may then more easily verify that certain transactions have occurred and that the data verifies such transactions.

In a first embodiment, a receipt wallet system includes a first processor and a first memory communicatively coupled to the first processor. The memory stores instructions which, when executed, cause the first processor to perform operations including receiving a purchase data, and transforming the purchase data into at least one receipt trail record. The instructions further cause the first processor to perform operations including storing the receipt trail record in a least one block of digital distributed ledger system, and distributing the at least one block among nodes of the digital distributed ledger system, wherein the digital distributed ledger system is configured to immutably store the data of the receipt trail record.

In a second embodiment, a method performed by at least one processor includes receiving a purchase data, and transforming the purchase data into at least one receipt trail record. The method further includes storing the receipt trail record in a least one block of digital distributed ledger system, and distributing the at least one block among nodes of the digital distributed ledger system, wherein the digital distributed ledger system is configured to immutably store the data of the receipt trail record.

In a third embodiment, one or more non-transitory computer-readable storage media, is provided, the media storing instructions which, when executed, cause at least one processor to perform operations including receiving a purchase data, and storing the receipt trail record in a least one block of digital distributed ledger system. The instructions further cause the at least one processor to perform operations including storing the receipt trail record in a least one block of digital distributed ledger system, and distributing the at least one block among nodes of the digital distributed ledger system, wherein the digital distributed ledger system is configured to immutably store the data of the receipt trail record.

In general, implementations of innovative aspects of the subject matter described in this specification can be embodied in an electronic distributed ledger that may include one or more receipt wallets. The distributed ledger may additionally include information and transactions for an entity or entities owners of each receipt wallet, such as retail clients, banking entities, insurance entities, investment entities, clubs, and so on. For example, a first entity (e.g., a client) may enter into a purchase transaction with a second entity (e.g., a retail store). Certain aspects of the purchase transaction, for example money exchange, merchandise purchase, transaction date, and so on, may be captured and encrypted as a receipt trail as further described below. The encrypted receipt trail may then be stored as part of a distributed ledger. The distributed ledger may provide for a secure, immutable system for maintain the receipt trail(s). When desired, the encrypted receipt trails may be used to verify the transaction, for example, via certain cryptographic techniques that verify the identity of the parties in the transaction, as well as other transactional record verification. The receipt trails may also be provided to a third party, such as a regulatory authority (e.g., tax entity). The third party may navigate the receipt trail, for example to verify that certain tax filings are correct.

Other implementations of any of the above aspects include corresponding methods, apparatus, and/or computer programs that are configured to perform the actions of the system. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The implementations described herein provide at least the following technical advantages and/or improvements compared to previously available techniques. Through use of digital distributed ledgers, receipt tracking, may be automated and made more efficient and less costly. Receipt trails may be crated, which may provide for immutable evidence of certain stored records and transaction. Accordingly, the digital distributed ledger implementations may provide an inexpensive, reliable, secure mechanism for storing and sharing receipt information, thus making efficient use of processing power, memory, storage space, network bandwidth, and/or other computing resources.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 4 depicts an example computing system, according to aspects of the present disclosure.

DETAILED DESCRIPTION

Figure 1:
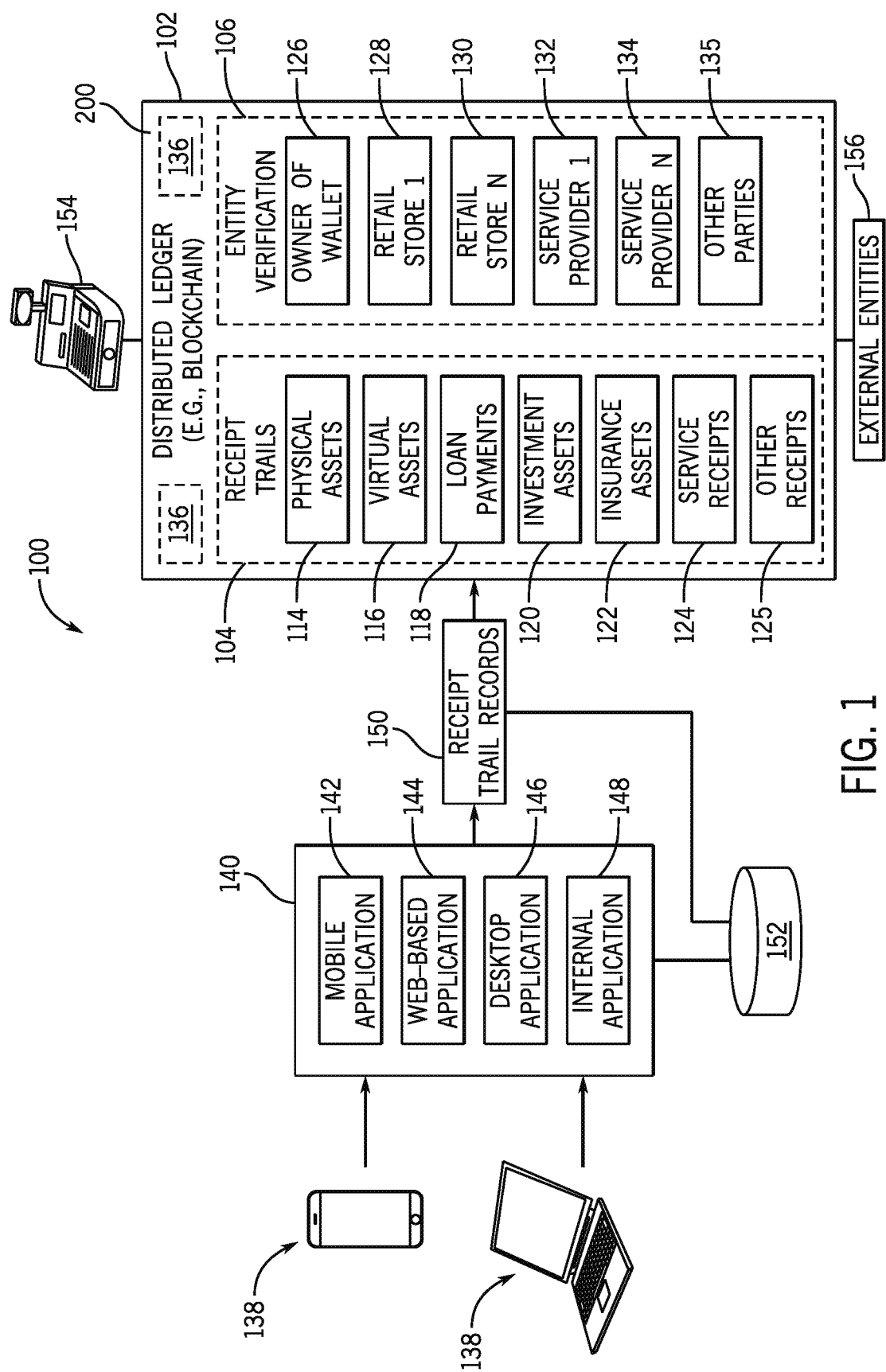
FIG. 1 depicts an embodiment of a system for receipt trail creation and management, according to aspects of the present disclosure.

Embodiments of the present disclosure are directed to systems, devices, methods, and computer-readable media for creating, maintaining, and tracking purchasing information via a receipt wallet using a distributed ledger, resulting in one or more receipt trails. A receipt trail may include information, such as documents used during a purchase transaction, useful in establishing a repository of purchase transaction records. Information stored in the receipt trail(s) may be tracked using a distributed ledger system, such as a system that includes one or more blockchains. The blockchain(s) provide immutable and secure data storage, which may be distributed across a plurality of computing systems or nodes. As new transactions occur, the new transactions may be included in the distributed ledger system, thus "growing" the receipt trails throughout the lifetime of the entity (e.g., client) being tracked. The distributed ledger system, such as one or more blockchains, may be used to store the information, including new transactions, more efficiently and inexpensively. The distributed ledger system also provides security, such that only authorized individuals and/or processes can access the data stored on the distributed ledger system. The distributed ledger system also provides immutability, such that data records written to the distributed ledger may not be changed or removed once written.

In certain embodiments, a blockchain may be used as a public or private receipt "wallet" of all purchase transactions that have been entered for the tracked entity. The blockchain may grow as new blocks are added based on a new set of transactions. In some examples, a single block is derived from multiple transactions. In general, blocks are added to the blockchain in a linear, chronological order by one or more computing devices in a peer-to-peer network of interconnected computing devices that execute a blockchain protocol. The peer-to-peer network may be described as a plurality of interconnected nodes, each node being a computing device that uses a client to validate and to relay transactions to other nodes. Each node may maintain a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions to validate a requested transaction, all entities should agree on which transactions have actually occurred, and in which order. For example, should two entities observe different transaction histories, they will be unable to come to the same conclusion regarding the validity of a transaction. The blockchain techniques described herein enable all entities to come to an agreement as to transactions that have already occurred, and in which order. As described in further detail below, a ledger of transactions for the receipt trail is agreed to based on the amount of work (e.g., computing work such as hashing) required to add a transaction to the audit ledger (e.g., add a block to the blockchain). Blockchains may also employ other protocols, for example, that may define "work" differently. The work may be a computing task that may be difficult for any single node (e.g., computing device) in the peer-to-peer network to complete quickly, but is relatively easy for any node (e.g., computing device) to verify.

The peer-to-peer network may include multiple "miners" (e.g., computing devices) that add blocks to a blockchain based on the blockchain protocol. In general, multiple miners validate transactions that are to be added to a block, and compete (e.g., perform computing work, as introduced above) to have their respective block added to the blockchain. Validation of transactions includes verifying digital signatures associated with respective transactions. For a block to be added to the blockchain, a miner must demonstrate a proof of work before their proposed block of transactions is accepted by the peer-to-peer network, and before the block is added to the blockchain. In certain embodiments, a blockchain protocol include a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value such that the output hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a "nonce" value (e.g., a random number used only once).

Multiple nodes may compete to hash a set of transactions and to provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. If the hash value meets the threshold hash (e.g., at least the first four characters of the hash value are each zero), the respective miner may have successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner produce hundreds of thousands (or more) of hash values, before any one miner provides a qualifying hash value (e.g., at least the first four characters of the hash value are each zero).

In some embodiments, the distributed ledger or blockchain system can include one or more sidechains. A sidechain may be described as a blockchain that validates data from other blockchains. In some examples, a sidechain may provide for granularity of information so that different information "types", (e.g., banking information, insurance information, asset information, investment information, and so on) may be stored in a different sidechain linked to a main chain. The blockchain may be a public blockchain, such that data stored on the blockchain is generally accessible. The blockchain or portions of the blockchain may alternatively or additionally be a private blockchain, such that the stored data is accessible only to authorized individuals and/or processes on the blockchain. By providing for letters of credit via blockchains, as further described below, enhanced transactional efficiencies, security, and information flows may be provided.

FIG. 1 depicts an embodiment of a receipt wallet system 100 for receipt trail creation and tracking, according to aspects of the present disclosure. As shown in the example of FIG. 1, the receipt wallet system 100 may include a distributed ledger system 102 that may include one or more blockchains. The distributed ledger system 102 may be hosted on any suitable number of computing devices that operate as nodes for the distributed ledger system 102. Such nodes may be geographically distributed in any suitable number of locations.

The distributed ledger system 102 may store any appropriate number of data records of various types, including receipt trail information 104. The receipt trail information 104 may in turn include records related to purchases, such as purchase records for physical assets 114, purchase records for virtual assets 116, payments records for loans 118, purchase records for investment assets 120, purchase records for insurance assets 122, records for purchases of services 124, and records for other purchases 125.

Purchase records for physical assets 114 may include receipts (e.g., price paid, seller entity information, date of purchase) for assets such as personal property and real property. The records 114 may additionally include any related information associated with the physical asset and the real property. For example, a description of the asset and property may be included, as well as copies of deeds, bill of sale contracts, copies of liens (e.g., car liens), valuation records, and so on, may be included in the Purchase records for physical assets 114. Likewise, purchase records for virtual assets 116 may include a receipt for the asset, a description of the asset (e.g., cryptocurrency type, video game currency type), and the like. Loan payment receipt trails 118 may include amount of payment, date of payment, remaining loan balance, interest paid, and so on, for loans such as mortgages, vehicle loans, personal loans, and so on. Purchase records for investment assets 120 may include a description of the investment (e.g., type of stock, type of bond) cost basis of the investment, date of purchase, amount of purchase, currency type used, and so on.

Purchase records for insurance assets 120 may include insurance contract details (e.g., payout amount, terms of the policy, limits of the policy, risks covered), future payouts (e.g., when insurance includes an investment component), beneficiary information, and so on. Service receipts 124 include type of service (e.g., medical service, construction service, financial service, banking service, insurance service, business service, rental service, etc.) service contract terms, past payments, future payments, and so on. Other receipt records 125 may include receipts for informal purchase agreements, miscellaneous receipts, and so on.

Each of the receipt trail records 114, 116, 118, 120, 122, 124, and 125 may include entity verification information 106 that identifies a particular entity, such as an individual, a corporation, a club, and so on, participating in the purchase transaction. For example, a wallet owner record 126 may include a unique identification, such as cryptographic key(s), certificates of trust, government identification (e.g., driver's license, passport) and the like, that uniquely identifies the owner of the wallet. The entity verification information 106 may additionally include retail store records 126 that uniquely identify a retail store (e.g., brick-and-mortar store and/or virtual store), such as cryptographic key(s), certificates of trust, government identification (business registration information, corporation information, and the like).

Entity verification information 106 for multiple stores may be included, such as retail store N records 130. Likewise, entity verification information 106 may include information to identify service providers, such as service provider records 132 and 134. The service providers may include health service providers (e.g., doctors, dentists, nurses, nutritionist, and so on), financial services provides (e.g., banks, investment counselors, and the like), insurance service providers (e.g., insurance sellers, brokers, agents, and the like), other service providers (e.g., any of a variety of service providers, such as hairstylists, tour guides, pet groomers, consultants, and so on). Other party records 135 may store any other party that was part of the purchase transaction, including house inspectors, mortgage brokers, banking entities, insurance entities, and so on.

In some embodiments, the distributed ledger system 102 may include a main blockchain 200 and one or more sidechains 136 that are linked to the main blockchain 200. In some embodiments, a sidechain 136 may be used to store certain record types. For example, a physical assets trail sidechain 136 may store only physical asset 114 records. Likewise, a virtual asset trail sidechain 136 may store only virtual asset records 116. Similarly, sidechains 136 may be used to store loan payment records 118, investment asset records 120, insurance asset records 122, service records 124, and/or other receipts 125. By using sidechains 136 dedicated to specific trail types 104-125, the techniques described herein may enable a more efficient record allocation in the distributed ledger 102. Further, in some embodiments, a side chain may be managed by other entities, for example, other receipt trail side chains 136 may be managed by multiple parties, such as a bank, a mortgage broker entity, a credit card processing entity and so on.

One or more computing devices 138 may have access to the distributed ledger system 102. In some instances, the computing devices 138 may be nodes that host a portion of the distributed ledger. Alternatively, the distributed ledger may be hosted on computing device(s) other than the computing devices 138. The computing devices 138 may include any suitable type of computing device, including portable computing devices (e.g., smartphone, tablet computer, wearable computer, etc.), workstations, desktop computers, servers, and so on. The computing devices execute certain applications 140. The applications 140 may include mobile applications 142 suitable for execution by mobile devices 138, web-based applications 144 that provide for a web interface, desktop applications 146 that may execute as native (e.g., operating system specific applications), and/or internal applications 148. The applications 140 may provide for techniques to enter receipt data. For example, a receipt from a vendor may be scanned (e.g., via cell phone camera) and then the applications 140 may convert the scanned data into receipt trail records 150. The receipt trail records 150 may then be stored as receipt trails 104 and/or entity verification information 106.

In certain embodiments, in addition to or alternative to scanning, receipt data may be received via email (e.g., email receipts), by wireless techniques (e.g., via Bluetooth communication, via Wi-Fi transmission and the like), by wired techniques, and the like, as well as through manual data entry. Templates may be used so that, for example, receipts (e.g., emailed receipts, scanned receipts) from certain vendors having a known structure (e.g., header identifying vendor information, fields identifying price paid, date of sale, description of sold item(s)) may be automatically decoded by the applications 140 without user input and then transformed into the receipt trail records 150. Likewise, credit card purchases may be scanned and/or downloaded and converted into the receipt trail records 150. Additionally, some point of sale terminals may transmit data through wireless or wired techniques and the data may then be processed by the applications 140 and translated into the receipt trail records 150 automatically. In certain embodiments, the applications 140 may be operatively coupled to the data repositories 152 to store and/or to extract information to create and/or grow the receipt trails 104. For example, the scanned receipts may be stored in the repository 152.

The applications 140 may also provide for the creation and/or updating of entity verification information 106. For example, a wallet owner may enter their personal information to then be stored as encrypted owner of wallet records 126. Likewise, information identifying retail stores, service providers, and/or other parties involved in purchase transactions may be inputted via the applications 140 and stored in the records 106. Use of a distributed ledger-based system 102 (e.g., blockchain system) provides for receipt trail creation and maintenance that is fast, inexpensive, ubiquitous, secure, and immutable. Accordingly, use of the distributed ledger system enables implementations to forego the need for a middleman that may act as a broker of certain information. The records included in the receipt trails 104 and entity verification information 106, once written, will remain part of the distributed ledger and be retrievable at any time. Indeed, the records of the receipt trails 114-125 may only grow, and thus provide for an immutable, time-based view of the information stored therein. Accordingly, embodiments enable the receipt trails 114-125 to be stored on the distributed ledger 102 in a manner that is more secure, immutable, and readily accessible (e.g., auditable) than traditional files stored in vulnerable paper form at banks, escrow agencies, investment agencies, insurance agencies, and so on. It is also to be noted that the distributed ledger 102 may be stored in hardware 154, thus providing for a hardware-based wallet. For example, the hardware 154 may include a universal serial bus (USB) drive that may store encrypted data, and that may include secure techniques to access the distributed ledger 102 stored therein. The receipt trails 104 and the entity verification information 106 may be provided to certain external entities 156, for example, for audit purposes, for regulatory purposes, and so on. External entities 156 may include private auditors, governmental entities (e.g., tax processing entities), public entities, and so on.

Figure 2:
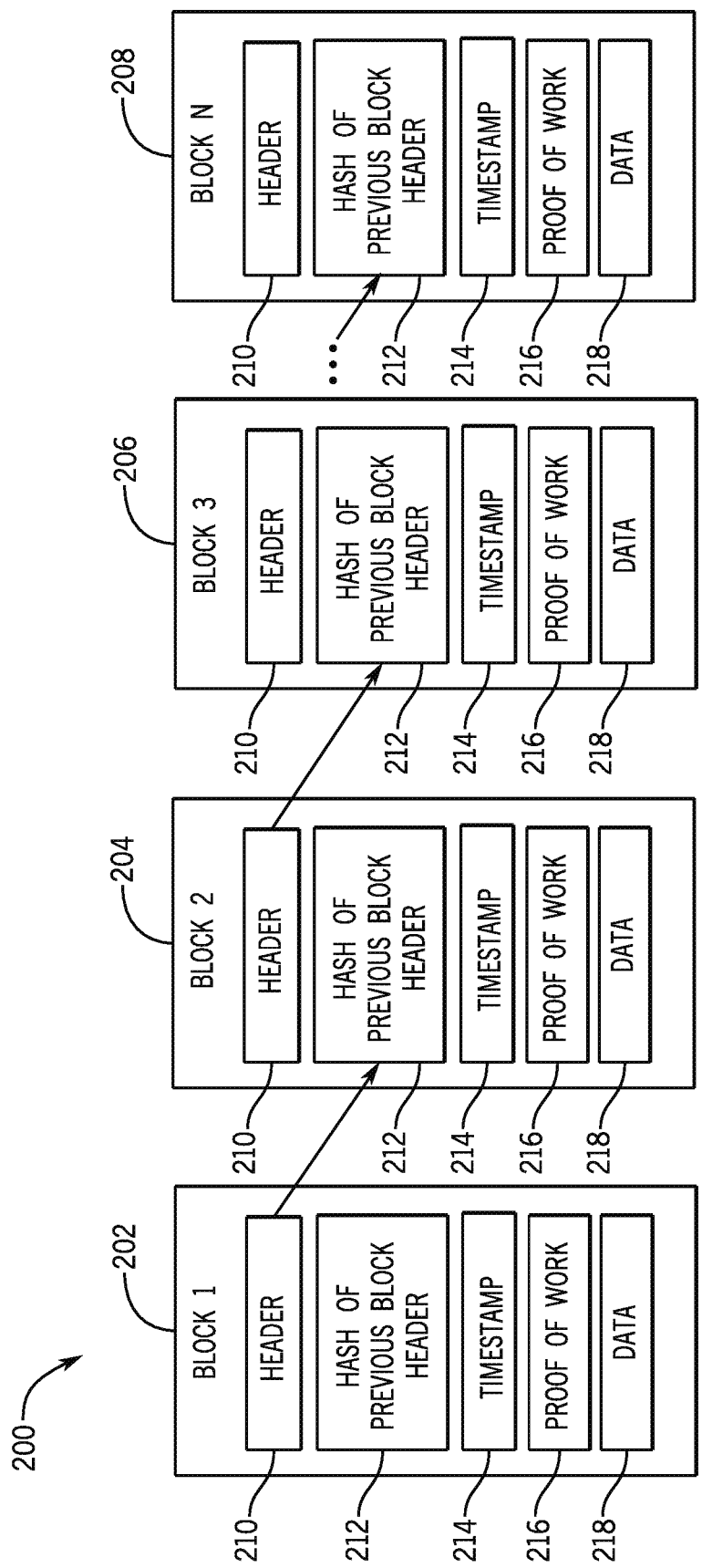
FIG. 2 illustrates a block diagram of an embodiment of a blockchain, according to aspects of the present disclosure.

FIG. 2 is a diagram depicting an embodiment of the blockchain 200. In the depicted embodiment, the blockchain 200 is illustrated as having multiple blocks 202, 204, 206, and 208. The block 202 (first block in the blockchain 200) may have been created, for example, and allocated as a special starting block. The block 202 may include a unique header 210 uniquely identifying the block 202 from other blocks in the blockchain 200. Because the block 202 is the first block in the blockchain 200, a hash of a previous block header 212 may be set to zero. A timestamp 214 may include the date of creation for the block 202, and a proof of work section 216 may include certain "work" that proves that a "miner" has performed work suitable for the creation of the block 202 and/or to verify transactions in the blockchain 200. The work section 216 may vary based on a protocol used to create the blockchain 200. For example, a bitcoin protocol may use a Merkle tree. The Merkle tree may be a tree data structure in which every leaf node is labelled with a hash (e.g., one-way hash) of a data block and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from our verified blockchain 200, and so on, down the tree. In other words, there's no way to create a fake value that would hash to our expected Merkle tree value (e.g., value stored in section 216 of the block 202), thus creating a single value that proves the integrity of all of the transactions under it.

Data, such as records included in the receipt trails 104-125 and/or the entity verification records 126-135, may be stored in a section 218 (and/or in another section). In certain embodiments, a new block may be created when a new record for any of the receipt trails 104-125 and/or the entity verification records 126-135 is to be created. For example, a new mortgage physical asset record 114 may result in the creation of a new block, which may be tied in via block ID to existing block(s) (e.g., storing entity verification record(s) 106). In another embodiment, empty blocks may be first created and then assigned to new records for the receipt trails 104-125 and/or the entity verification records 126-135. When a new block is created, the block will receive a new header 210 uniquely identifying the new block. As mentioned earlier, a peer-to-peer network may include multiple "miners" (e.g., computing devices 138) that add blocks to the blockchain 200 based on the blockchain protocol. In general, multiple miners validate transactions or data 218 that are to be added to a block, and compete (e.g., perform computing work, as introduced above) to have their respective block added to the blockchain 200. Validation of transactions and/or data includes verifying digital signatures associated with respective transactions and/or data 218. For a block to be added to the blockchain 200, a miner must demonstrate a proof of work before their proposed block of transactions is accepted by the peer-to-peer network, and before the block is added to the blockchain 200. In certain embodiments, a blockchain protocol include a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value such that the output hash value cannot be 'un-hashed' to determine what the input was. The blockchain protocol can require multiple pieces of information as input to the CHF. For example, the input to the CHF can include a reference to the previous (most recent) block (e.g., hash 150) in the blockchain 200, details of the transaction(s) or data 218 that are to be included in the to be created block, and a "nonce" value (e.g., a random number used only once).

Multiple nodes may compete to hash a set of transactions and to provide the next block that is to be added to the blockchain 200. The blockchain protocol may provides a threshold hash to qualify a block to be added to the blockchain 200. For example, the threshold hash can include a predefined number of zeros (0's) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 200. Each miner provides the reference to the previous (most recent) block in the blockchain 200, details of the data or transaction(s) 218 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. If the hash value meets the threshold hash (e.g., at least the first four characters of the hash value are each zero), the respective miner may have successfully created the next block that is to be added to the blockchain 200. Consequently, the respective miner's block is broadcast across the peer-to-peer network (e.g., all devices 138 communicatively coupled to the system 102). All other miners cease work (because one miner was already successful), and all copies of the blockchain 200 are updated across the peer-to-peer network to append the block to the blockchain 200. Each miner produce hundreds of thousands (or more) of hash values, before any one miner provides a qualifying hash value (e.g., at least the first four characters of the hash value are each zero).

It is to be noted that any computing device, such as devices 138 may be miners. Accordingly, as new records for the receipt trails 104-125 and/or the entity verification records 126-135 are created, new blocks are added to the blockchain 200, including blocks 202, 204, 206, and 208. Indeed, the blockchain 200 may continue to grow, storing new records for the audit trails 104-112. Because of the distributed nature of the peer-to-peer network created via the distributed ledger system 102, each node (e.g., computing devices 138) may include copies of the blockchain 200 and share copies of the blockchain 200 as new peers enter the peer-to-peer network. Each copy of the blockchain 200 may include verified information (e.g., records for the receipt trails 104-125 and/or the entity verification records 126-135) for all or substantially all of the information tracked by the distributed ledger system 102. The information is secure, immutable, and more efficiently tracked as new assets get added via the distributed ledger system 102. Accordingly, relationships, transactions, or information between entities may be captured, as shown in FIG. 3.

Figure 3:
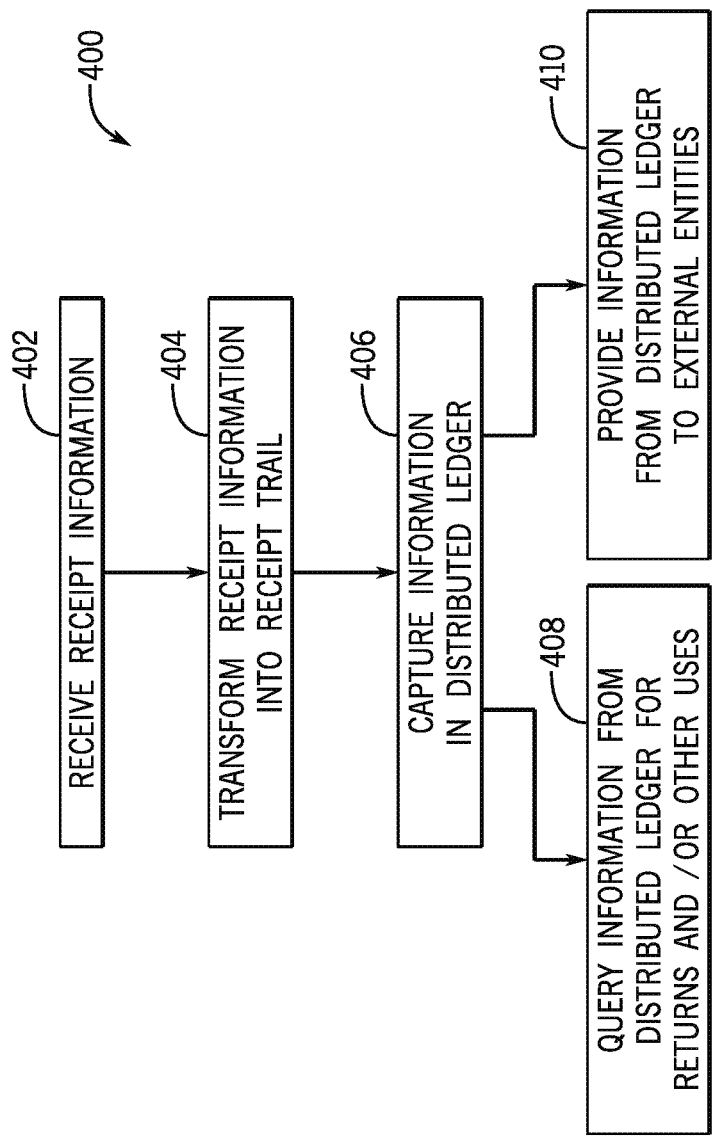
FIG. 3 is a flowchart depicting an embodiment of a process for the creation and storage of certain receipt data to be stored as receipt trails, as well as for querying the receipt trails according to aspects of the present disclosure.

FIG. 3 is a flowchart depicting an embodiment of a process 400 for the creation and storage of certain receipt trails 104-125 and/or the entity verification records 126-135, as well as for querying the receipt trails 104-125 and/or the entity verification records 126-135. The process 400 may be implemented as computer code or instructions executable, for example, by the computing devices 138. In the depicted embodiment, the process 400 may receive (block 402) certain receipt information. For example, the applications 140 may receive purchase data for a purchase transaction that includes one or more sellers, one or more buyers, an item and/or service sold, a price paid, warranty information, information to maintain or pertaining a uniform commercial code (UCC) compliance or regulation, and so on. As mentioned earlier, the purchase data may be emailed, may be transmitted via wireless techniques (e.g., Bluetooth, Wi-Fi), may be typed in, or a combination thereof. The process 400 may then transform (block 404) the receipt information by into the receipt trails 104-125 and/or the entity verification records 126-135. For example, a linked record may be created that stores sellers and buyers information, e.g., entity verification information 106 for both the buyers and the sellers. The linked record may then be stored as part of the receipt trail 104. In some cases, a new entity verification information 106 may be created, for example when buying from a seller that was not previously in the system 100. Accordingly, the process 400 may store a new seller identification information (e.g., verification information 106), including name, business identification, address, and so on.

Once the receipt trails 104-125 and/or the entity verification records 126-135 are created, the process 400 may capture and store (block 406) the receipt trails 104-125 and/or the entity verification records 126-135 in the distribute ledger system 102. For example, new blocks may be created in the blockchain 200 and section 218 of the new blocks may be used to store the information found in the receipt trails 104-125 and/or the entity verification records 126-135. As mentioned earlier, storing information in the blockchain 200 may provide for fast, inexpensive, ubiquitous, secure, and immutable storage capabilities of receipt information, including information that is relevant to regulatory compliance (e.g., UCC compliance, SEC compliance, HIPAA compliance, and so on). In certain embodiments, cryptographic techniques such as private-public key techniques (e.g., Pretty Good Privacy (PGP) encryption) may be used to store the receipt trails 104-125 and/or the entity verification records 126-135 in the distributed ledger 102. For example, certain entities, including buying entities, selling entities, auditing entities, and the like, may share their public keys. The public keys in combination with a private key (e.g., private key held by applications 140) may then be used to encrypt the information into the distributed ledger 102.

The process 400 may also provide for access to the receipt trails 104-125 and/or the entity verification records 126-135. In the depicted example, the process 400 may query (block 408) information included in the distributed ledger 102 to return an item or for other uses. For example, a wallet owner may wish to query all purchases that occurred in a given time period (e.g., one week, one month, one year), purchases from a certain store, purchases from a certain service provider, and so on. The wallet owner may additionally or alternatively wish to query purchases over a certain amount, purchases from certain buyers, and so on.

The process 400 may additionally provide (block 410) information included in the distributed ledger 102 to external entities 156. For example, a subset of the data stored in the distributed ledger 102 may be queried to provide for records useful for tax purposes. That is, donation amounts, transfers of gifts, and so on, may be verified via the distributed ledger 102. Similarly, the distributed ledger 102 may be queried to provide for internal corporate audits, external audits, personal expenditure audits, and so on.

FIG. 4 depicts an example computing system, according to implementations of the present disclosure. The system 500 may be used for any of the operations described with respect to the various implementations discussed herein. For example, the system 500 may be included, at least in part, in one or more of the user device(s) 138, the node(s) that host the distributed ledger 102, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices 138 of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code), such as one or more programs used to implement the process 400, may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. One or more tangible, non-transitory, computer-readable storage media storing instructions thereon which, when executed by at least one processor, cause the at least one processor to perform operations comprising:
 establishing a communicative coupling with a point of sale terminal;
 receiving, from the point of sale terminal, completed purchase data;
 transforming the completed purchase data into a receipt trail record;
 storing the receipt trail record in at least one block of a digital distributed ledger system; and
 distributing the at least one block among nodes of the digital distributed ledger system.

2. The one or more tangible, non-transitory, computer readable media of claim 1, wherein the operations comprise receiving, from the point of sale terminal, the completed purchase data including data indicative of a physical asset and a purchase price paid for the physical asset.

3. The one or more tangible, non-transitory, computer readable media of claim 1, wherein the operations comprise receiving, from the point of sale terminal, the completed purchase data including data indicative of a service and a purchase price paid for the service.

4. The one or more tangible, non-transitory, computer readable media of claim 1, wherein the instructions, when executed, cause the at least one processor to perform operations comprising preparing a receipts audit report based on the receipt trail record by querying the digital distributed ledger system.

5. The one or more tangible, non-transitory, computer readable media of claim 1, wherein the operations comprise distributing the at least one block among the nodes of the digital distributed ledger system via a peer-to-peer network.

6. The one or more tangible, non-transitory, computer readable media of claim 1, wherein the instructions, when executed, cause the at least one processor to perform operations comprise storing a wallet owner identification record in the digital distributed ledger system prior to transforming the completed purchase data into the receipt trail record.

7. The one or more tangible, non-transitory, computer readable media of claim 1, wherein the operations comprise establishing the communicative coupling with the point of sale terminal via a Bluetooth or Wi-Fi connection with the point of sale terminal.

8. The one or more tangible, non-transitory, computer readable media of claim 1, wherein the instructions, when executed, cause the at least one processor to perform operations comprise querying the digital distributed ledger system in response to a request to return an item associated with the completed purchase data.

9. A system, comprising:
a point of sale terminal configured to generate purchase data corresponding to a purchased product or service;
at least one processor configured to:
establish a communicative coupling with the point of sale terminal;
receive the purchase data from the point of sale terminal;
transform the purchase data into a receipt trail record;
store the receipt trail record in at least one block of a digital distributed ledger system; and
distribute the at least one block among nodes of the digital distributed ledger system.

10. The system of claim 9, wherein the at least one processor is configured to:
receive, from the point of sale terminal, the purchase data including first data indicative of a physical asset and a first purchase price paid for the physical asset; or
receive, from the point of sale terminal, the purchase data including second data indicative of a service and a second purchase price paid for the service.

11. The system of claim 9, wherein the at least one processor is configured to transform the purchase data into the receipt trail record by linking at least one seller verification record to at least one buyer verification record as a linked record and storing the linked record in the receipt trail record.

12. The system of claim 9, wherein the at least one processor is configured to prepare a receipts audit report based on the receipt trail record by querying the digital distributed ledger system for a tax-based subset of data, an internal corporate audit subset of data, a personal expenditures subset of data, or any combination thereof.

13. The system of claim 9, wherein the at least one processor is configured to establish the communicative coupling with the point of sale terminal via a wireless connection.

14. The system of claim 9, wherein the at least one processor is configured to distribute the at least one block among the nodes of the digital distributed ledger system via a peer-to-peer network.

15. The system of claim 9, wherein the point of sale terminal is configured to:
enable a credit card purchase; and
generate the purchase data from the credit card purchase.

16. A computer-implemented method, comprising:
receiving, via at least one processor, completed purchase data including:
first data indicative of a physical asset and a first purchase price paid for the physical asset; or
second data indicative of a service and a second purchase price paid for the service;
transforming, via the at least one processor, the completed purchase data into a receipt trail record;
storing, via the at least one processor, the receipt trail record in at least one block of a digital distributed ledger system; and
distributing, via the at least one processor, the at least one block among nodes of the digital distributed ledger system.

17. The computer-implemented method of claim 16, comprising:
establishing a communicative coupling between the at least one processor and a point of sale terminal; and
receiving, via the at least one processor and from the point of sale terminal, the completed purchase data.

18. The computer-implemented method of claim 16, comprising preparing, via the at least one processor, a receipts audit report based on the receipt trail record by querying the digital distributed ledger system for a subset of data, the subset of data comprising a tax-based subset, an internal corporate audit subset, a personal expenditures subset, or any combination thereof.

19. The computer-implemented method of claim 16, comprising distributing, via the at least one processor, the at least one block among the nodes of the digital distributed ledger system via a peer-to-peer network.

20. The computer-implemented method of claim 16, wherein transforming, via the at least one processor, the completed purchase data into the receipt trail record comprises:
linking at least one seller verification record to at least one buyer verification record as a linked record; and
storing the linked record in the receipt trail record.

* * * * *